D. P. SHARP.
HORSE HAY-RAKES.
No. 169,853. Patented Nov. 9, 1875.
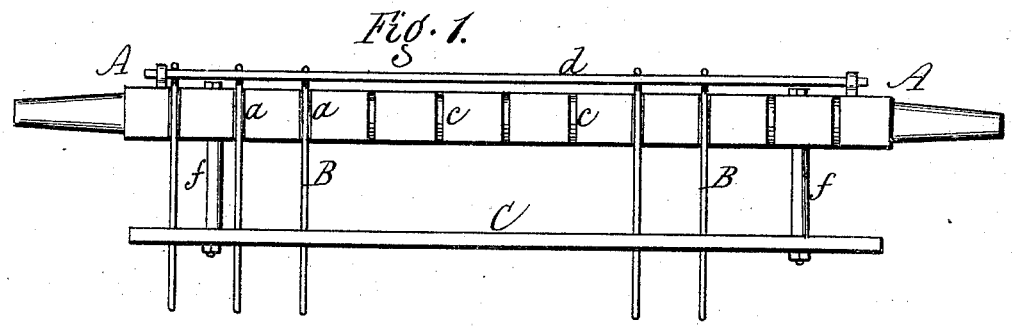
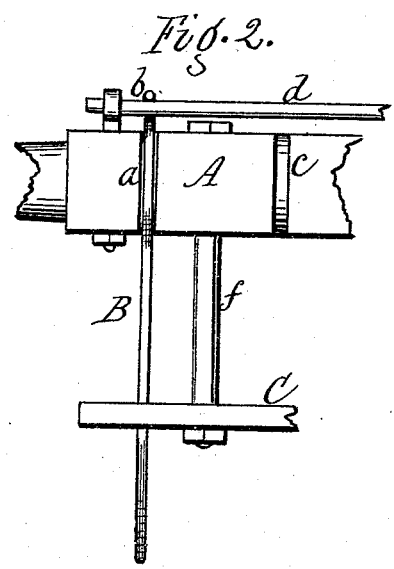
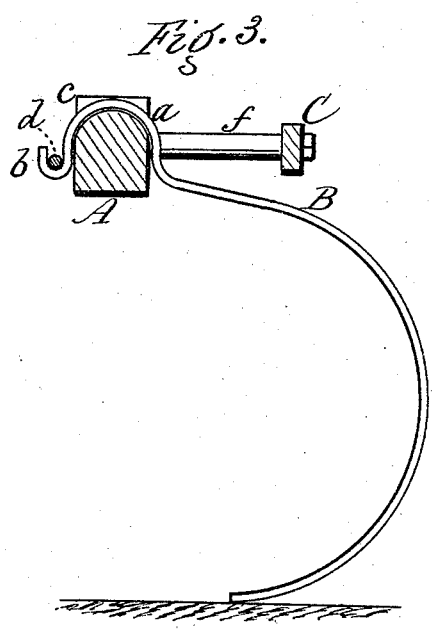
Witnesses.
Edwin B. Scott
Louis Spahn
Inventor.
Dennis P. Sharp,
pr R. F. Osgood,
Atty.

UNITED STATES PATENT OFFICE.

DENNIS P. SHARP, OF ITHACA, NEW YORK.

IMPROVEMENT IN HORSE HAY-RAKES.

Specification forming part of Letters Patent No. 169,853, dated November 9, 1875; application filed April 2, 1875.

*To all whom it may concern:*

Be it known that I, DENNIS P. SHARP, of Ithaca, in the county of Tompkins and State of New York, have invented a certain new and useful Improvement in Horse-Rakes; and I do hereby declare that the following is a full, clear, and exact description of the construction and operation of the same, reference being had to the accompanying drawings, in which—

Figure 1 is a plan of the axle of a horse hay-rake, showing my improvement applied thereto. Fig. 2 is a similar view on an enlarged scale. Fig. 3 is a vertical cross-section.

My improvement relates to the method of connecting the teeth with the axle, so that they may have a degree of vertical play in passing over inequalities of the ground. The object is to secure simplicity and cheapness of construction.

My invention consists of teeth constructed with half-circular bends and hook ends at the top, in combination with an axle having corresponding half-circular grooves or gains, in which the bends fit and turn, and a rod in front, with which the hooks engage, all as hereinafter described.

A represents the axle, and B B the teeth. The teeth are of the usual form, with the exception that, at the top, they have half-circular bends *a a* and hooks *b b*, which turn upward and outward from the lower ends of the bends, as shown. The axle is square or rectangular in cross-section, and has half-circular grooves or gains *c c* cut in its top by a circular saw, in which grooves the bends *a a* of the teeth fit. It also has attached to its front side a rod, *d*, with which the hooks *b b* engage by hooking under, as shown. On the rear side of the axle is attached the usual bar C, for holding the teeth down to their work, the attachment being made by arms *f f*. The bar rests at such a distance above the teeth as to allow the latter to rise and fall in passing over inequalities of the ground, and the hooks *b b* are made of such length that they will not disengage from the rod *d* as the teeth rise in the rear. The teeth being thus restrained in front and rear, but having a free motion, the bends *a a* turn in the grooves *c c*, the half-circular form allowing them to do so with ease, and the whole action is thus made effective. The grooves in the axle not only allow the free turning of the teeth, but also confine the teeth against lateral displacement. I can use the square axle, thereby saving the cost of turning.

Having thus described my invention, what I claim as new is—

The combination of the rake-teeth B, formed at their upper ends with bends *a* and hooks *b*, with axle A, grooved as shown, to receive the said bends, rod *d*, and bar C, arranged to permit the teeth to rise and fall without becoming detached, as and for the purpose set forth.

In witness whereof I have hereunto signed my name in the presence of two subscribing witnesses.

DENNIS P. SHARP.

Witnesses:
 R. F. OSGOOD,
 EDWIN B. SCOTT.